T. J. CHRISTY.
Trace Fastener and Protector.
No. 212,660.  Patented Feb. 25, 1879.
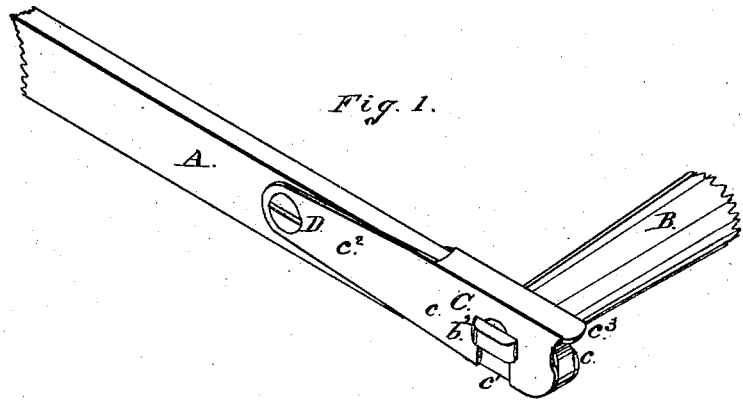
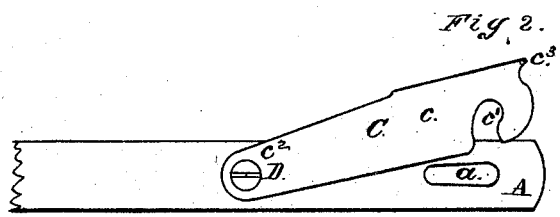
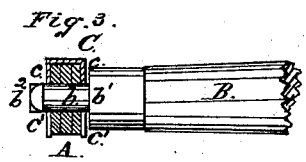
Witnesses:
G. Harry Knight.
Walter Allen
Inventor:
Thomas J. Christy
By Knight Bros.
Attys.

UNITED STATES PATENT OFFICE.

THOMAS J. CHRISTY, OF ST. LOUIS, MISSOURI, ASSIGNOR OF ONE-HALF HIS RIGHT TO FRANK RICKER, OF SAME PLACE.

IMPROVEMENT IN TRACE FASTENER AND PROTECTOR.

Specification forming part of Letters Patent No. 212,660, dated February 25, 1879; application filed December 5, 1878.

*To all whom it may concern:*

Be it known that I, THOMAS J. CHRISTY, of the city of St. Louis, in the State of Missouri, have invented a certain new and useful Improvement in Trace Fastener and Protector, of which the following is a full, clear, and exact description, reference being had to the accompanying drawings, forming part of this specification.

My improvement relates to a device to prevent the detachment of the trace from the single-tree and to protect the end of the trace from injury; and it consists in a compound plate, pivoted at one end to the trace, and hooking over the trace-pin of the single-tree at both sides of the trace.

In the drawings, Figure 1 is a perspective view of my device. Fig. 2 is a side view of the end of a trace with fastener raised for the entrance of the single-tree pin. Fig. 3 is a transverse section axial to the single-tree pin.

A is the rear end of a leather trace. B is one end of a single-tree, and $b$ the trace-pin. The fastener and protector is shown at C. It has two sides, $c\ c$, embracing the trace A between them with sufficient pressure to hold the fastener in place. In the sides are recesses $c^1\ c^1$, through which the pin $b$ passes when the fastener is in place, as shown in Fig. 1, the sides $c\ c$ being, respectively, between the trace and the shoulder $b^1$ and bottom or cross bar, $b^2$, of the single-tree.

Thus, it will be seen that the fastener holds the trace upon the pin $b$, and prevents the tearing of the eyelet $a$ in the trace in case of extreme strain.

The fastener C is secured to the trace by a pivot-screw or rivet, D, through the trace, and through two ears, $c^2$, upon the fore end of the fastener. $c^3$ is a lip upon the rear end of the fastener, which is engaged by the finger to raise that end when the trace is to be removed from the pin $b$.

The recesses $c^1$ may be simple straight slots, or they may be so formed (see Fig. 2) as to give a hooked form to the fastener.

The fastener C may be made of any kind of metal, plated or plain.

In use upon traces having more than one eyelet, $a$, the fastener may have the requisite number of recesses $c^1$, or there may be the required number of holes in the trace for reception of the pivot D, so as to allow the fastener to be changed, to suit it to any one of the eyelet-holes $a$.

The purpose of the fastener and protector is threefold: first, it prevents the accidental detachment of the trace from the pin $b$; second, it prevents injury to the trace-eyelet $a$ from excessive strain, and thus danger arising from the tearing out of the eyelet is avoided; third, it prevents wear of the end of the trace.

It is very easily operated, as a simple movement serves to release its hold upon the pin $b$ or to engage it therewith.

It demands no special form of trace, but can be applied to any trace having an eyelet, $a$.

I claim as my invention—

The fastener C, pivoted at its forward end to the trace, its rear end adapted to hook over and embrace the trace on each side when attached to the single-tree, and having the finger-piece $c^3$ and recesses $c^1$, substantially as and for the purposes set forth.

THOMAS J. CHRISTY.

Witnesses:
SAML. KNIGHT,
G. HARRY KNIGHT.